United States Patent [19]

Gallagher

[11] Patent Number: 5,008,861
[45] Date of Patent: Apr. 16, 1991

[54] GEOPHYSICAL EXPLORATION BY AUTOMATICALLY PICKING AND ASSOCIATING STACKED SEISMIC SECTIONS WITH REGIONAL COHERENCY PEAKS OF VELOCITY SPECTRA

[75] Inventor: John N. Gallagher, Tulsa, Okla.
[73] Assignee: Amoco Corporation, Chicago, Ill.
[21] Appl. No.: 319,609
[22] Filed: Mar. 6, 1989
[51] Int. Cl.⁵ .......................... G01V 1/36; G01V 1/34
[52] U.S. Cl. ......................... 367/59; 367/38; 367/68; 364/421
[58] Field of Search ..................... 367/51, 52, 59, 68, 367/73, 63, 38; 364/421

[56] References Cited
U.S. PATENT DOCUMENTS
4,849,887 7/1989 Skylas .................................. 367/52

Primary Examiner—Ian J. Lobo

[57] ABSTRACT

Regional velocity spectra coherency peaks are associated with peak events on a stacked seismic section of CMP gathers and used for editing siesmic data. In addition, travel time and spatial location along a seismic line data are displayed for stratigraphic and structural interpretation.

52 Claims, 11 Drawing Sheets

GEOPHYSICAL EXPLORATION BY AUTOMATICALLY PICKING AND ASSOCIATING STACKED SEISMIC SECTIONS WITH REGIONAL COHERENCY PEAKS OF VELOCITY SPECTRA

FIELD OF THE INVENTION

The invention relates to the processing and interpretation of seismic traces and in particular aspects to velocity analysis for determining stacking velocity functions and for determining horizon velocity functions.

SETTING OF THE INVENTION

Seismic data provides an indirect measurement of velocity with which seismic waves travel in the earth as a function of depth. Sonic logs are usually considered to provide a more direct measurement. Based on these, the explorationist derives velocities such as interval, apparent, average, root-mean-square (RMS), instantaneous, phase, group, normal moveout (NMO), stacking and migration velocities.

The common midpoint (CMP), also called common depth point or common reflection point, gather technique of seismic exploration significantly contributes to identification of primary reflections against a background of noise. The CMP gather represents multifold seismic data obtained at locations in the subsurface by sampling them repeatedly by seismic initiations (shots) at different source locations while an array of receivers is stationary or is rolled past the source locations. The result is a set of seismic traces which is or can be sorted to produce CMP gathers, which can then be processed, for example, by normal moveout (NMO) correction, statics correction, and the like to produce processed CMP gathers which can be used to generate a stacked seismic section in the time-CMP domain usually referred to herein as the T-X domain. Velocity estimates made in various ways during processing can also be displayed in velocity displays.

The velocity that can readily be derived from seismic data is the stacking velocity. Stacking velocity can be related to NMO velocity which in turn can be related to RMS velocity from which average and interval velocities can be derived.

Velocity analysis is the process of determining a stacking velocity function for the stacking of CMP gathers. The stacked seismic section of NMO-corrected CMP gathers is a fundamental tool used in exploration for oil and gas. The term velocity analysis is also sometimes used to refer to subsequent processing used for detailed velocity determinations. The stacking velocity required is that producing maximum coherency in the primary reflection data. Often, this velocity is known simply as the stacking velocity. It is also sometimes referred to as maximum coherency stacking velocity moveout velocity, normal moveout velocity, CMP velocity, and the like.

Normal moveout (NMO) is the time shift that must be applied to a reflection time ($T_x$) of a seismic signal received by a receiver having offset X to reduce it to the time $T_0$ that would have been recorded at zero offset (normal incidence). Accordingly, the NMO can be given by $$\Delta T = T_x - T_0$$

For each trial stacking velocity, V, NMO corrections are applied to each of the traces of the CMP as a function Time (depth) according to $$\Delta T = \left( T_0^2 + \frac{X^2}{V^2} \right)^{\frac{1}{2}} - T_0 \quad (1)$$

or a similar relationship.

Velocity analysis conventionally consists of time shifting traces $\Delta T$ in a CMP gather using assumed values of V and $T_0$ and evaluating the coherence of the resulting time shifted traces, i.e., the extent to which the different traces after time shifting are in-phase. Typically, a wide range of values for V and virtually all T (traveltimes) of a CMP gather record, typically spanning about 6000 msec (milliseconds) must be evaluated. The evaluation can involve, for example, generating measures of coherence over a range of V for a time T, then incrementing time T and again generating measures of coherency over a range of V for the incremented time T, and continuing the process until the full range of seismic traveltimes is covered. Alternatively, the evaluation can involve, for example, generating measures of coherency over a range of time $T_x \pm$ a selected time increment $t_i$, then incrementing $T_x$ by $t_i$ and continuing the process until the full range of seismic traveltimes is covered.

Velocity analysis can be further constrained by stacking velocity fairway editing as is known in the art before or after generating such measures of coherency. A stacking velocity fairway is simply a band of possible stacking velocities in the T-V (time-velocity) domain within which one searches for velocity picks (regional coherency maxima) for generating a stacking velocity function.

The results of velocity analysis for a given CMP location along a seismic line is a set $\{(T,V,X,C)\}$ of data which can be displayed in a velocity spectrum, for example, with coherency contoured (T,V,C) data plotted therein at various positions X in the time-velocity (T-V) domain. Thus, FIG. 1A illustrates velocity spectra having coherency-contoured (T,V,C) data plotted therein at positions X along a seismic line of exploration.

A high value of coherency implies that similar energy is arriving on all of the traces and that the corresponding stacking velocity function will move the traces in phase. Ideally, a velocity spectrum is produced for each CMP gather and evaluated to determine which velocity function best aligns the seismic traces in the gather, that is, produces the maximum coherency.

The velocity spectra aid the explorationist to distinguish between primary and multiple reflections and also to determine a stacking velocity function for use in stacking CMP gathers. Referring to FIG. 1A, a stacking velocity function is illustrated by the dashed line labeled F(T,V) connecting regional coherency maxima from shallow to middle to deep events as indicated by increasing traveltime. It can be seen that the stacking velocity function generally tracks regional coherency maxima. Regional coherency maxima are coherency peaks on a region-by-region basis in the T-V domain regardless of whether the regional coherency peaks ar the highest in absolute value. In fact, coherency peaks associated with multiples are often higher in absolute value than coherency peaks associated with primary reflections so the use of relative or regional coherency peaks is preferred and even necessary.

Frequently, velocity spectra are produced at spaced apart more or less regular intervals along the seismic line. In principle, it is desirable to produce velocity spectra at closely spaced or even at every CMP location as shown in FIG. 1A to improve accuracy of resulting stacked seismic sections and also provides data redundancy for more reliable estimates of stacking velocity errors. However, since each point on a velocity spectrum represents a (T,V,X,C) datum, such a complete set {(T,V,X,C)} of velocity spectral data constitutes a monumental set with accompanying difficulties of processing and interpretation.

The typical procedure has therefore been to produce and examine velocity spectra at intervals spaced apart along the seismic line in hardcopy. This examination leads to further refinement of the traveltime/stacking velocity fairways, selection of stacking velocity function, and production of tentative NMO corrected stacked sections until the explorationist is reasonably satisfied with the result. This procedure is tedious and time consuming and may use only a small portion of the data available in arriving at the final stacking velocity and other functions and may also lead to erroneous interpretations.

It is desirable to increase the amount of data taken into consideration in arriving at stacking velocity functions for stacking seismic data and to reduce the time and difficulty required by the typical procedure in arriving at reliable stacked seismic sections and in arriving at reliable migrated velocity and interval velocity information and displays.

It is further desirable to provide apparatus and method for determining horizon velocity functions and for increasing the reliability and usefulness of such functions.

It is further desirable to provide apparatus and method for editing velocity spectra regional coherency peaks and for producing functions and subsets of edited peaks for use in geophysical exploration.

It is further desirable to provide apparatus and method for picking and associating horizon events (t, x) or horizon time and time dip pairs (t, δt) from stacked seismic sections with regional coherency peaks (T,V,X,C') of velocity spectra.

DEFINITIONS AND NOTATION

As used herein, a set of data {(a,b)} and the like will be a set of data in which each element is of the form (a,b). A set, {(a,b,c,d)} will also include subsets {(a,b,c)}, {(a,b)}, and the like where the subsets are obtained from the original set by omission of one or more variables. The notation {(A,B,C,D)↔(a,b)} and the like will be used to indicate that between given elements (A,B,C,D) and (a,b) there is a one-to-one relationship, that is, for each element (A,B,C,D) there is assigned one and only one (a,b) and conversely.

SUMMARY OF THE INVENTION

In one aspect, the invention relates to automatically picking seismic events contributing to horizons from sections of stacked seismic records. In a further aspect, the invention relates to a method for associating such events into horizon event segments and into horizons and for characterizing events contributing to each such segment and horizon by time and spatial location pairs (t, x), by time and time dip per trace (t, δt) pairs or by both.

In another aspect, the invention relates to using seismic events contributing to horizons on seismic traces for selecting regional coherency peaks from a set of velocity analysis data {(T,V,X,C')}.

According to this aspect of the invention, the independent information, either {(t, x)} or {(t, δt)}, in a stacked seismic section is used to select only those coherency peaks (T,V,X,C') in velocity spectra which are in close proximity to reflection horizons. This approach selects more accurate velocity events for normal movement correction, but perhaps more importantly relates them to horizons which are the fundamental features mapped in the search for hydrocarbons.

According to the invention, there is method and apparatus for geophysical exploration. A first and second set of data points generated from seismic traces are obtained, the second set of data points being smaller than the first set of data points and the first and second sets of data points having a common dimension or variable. Then, data points of the first set are associated with data points of the second set and a set of one-to-one corresponding data points of the first and second sets is produced.

According to a further aspect of the invention, the first set of data points comprises a set {(T,V,X,C)} of velocity spectra data produced by velocity analysis of a set of common midpoint (CMP) gathers, each gather having a CMP location X and the analysis comprising varying travel time T and trial stacking velocity V over a selected range of values and determining the values of coherency C therefor, the dataset thus comprising a set {(T,V,X,C)} of data, each (T,V,X,C) thus representing a value of coherency C for a given T,V trial at CMP position X. The second set of data points comprises a set {(t,x)} of data selected from a seismic section of stacked CMP gathers and data points (T,V,X,C) are associated with data points (t,x) to produce a one-to-one corresponding set of data points {(T,V,X,C)↔(t,x)}. According to a further aspect, the first set of data points comprises a set {(T,V,X,C')} of regional coherency peaks of {(T,V,X,C)} velocity spectra data obtained by selecting the location (T,V) of regional coherency peaks C' for velocity spectra at locations X along a seismic line, each (T,V,X,C') thus representing the local coherency peak C' at position T,V on a velocity spectrum produced at CMP position X.

According to a further aspect, the second set of data points is obtained by method and apparatus for establishing a threshold for determining which seismic events on a stacked seismic section of CMP gathers shall be machine picked, by machine scanning each trace contributing to a stacked seismic section and picking seismic events meeting the threshold requirements, and characterizing each such pick by a (t,x) pair and storing the set {(t,x)} as the second set of data points.

According to a further aspect, the second set of data points is produced by a method and apparatus for sequencing thus picked peak values (t,x) into horizon event segments E {(t,x)} spanning two or more traces and then associating the travel time t of selected horizon event segments E {(t,x)} with values T of the {(T,V,X,C')} dataset and generating a set {(T,V,X,C')↔(t,x)} therefrom.

According to further aspects, thus picked peak values (t,x) are sequenced into horizon event segments E {(t,x)} spanning two or more traces, such event segments are concatenated into horizon segments H {E{(t,x)}}, and the associating step comprises associating (t,x) of such sequenced and concatenated horizons with (T,V,X,C) or (T,V,X,C') data.

According to a further aspect, there is method and apparatus for determining the actual time dip per trace value δt for the thus assigned picked peak value on the further trace and using δt as the predicted Δt for determining location of a time window on a yet further trace and assigning a picked peak value (t,x) on the yet further trace to an event segment.

According to further aspect, the invention comprises calculating picked peak values (t,x) for traces intermediate the further trace and the yet further trace responsive to the yet further trace not being the next adjacent trace of the further trace.

According to a further aspect, a horizon event segment E {(t,x)} is truncated or terminated upon occurrence of picked peak values (t,x) not being assigned thereto for a preselected number of adjacent traces.

According to further aspects, these steps can be repeated for two or more other traces. According to further aspects, the invention comprises method and apparatus for associating one of the sets E {(t,x)}, E {(t δt)} and E {(t,x,δt)} with selected (T,V,X,C') values and generating a set of one-to-one correspondences selected from the group consisting of {(T,V,X,C')↔(t,x)}, {(T,V,X,C')↔(t,δt)} and {(T,V,X,C')↔(t,x,δt)}. According to yet other aspects, the set {(T,V,X,C')} is further restricted by selecting a T-V fairway range and/or a T-X fairway range and including only (T,V,X,C') having respectively (T,V) or (T,X,) values inside the selected fairway.

According to further aspects, the invention comprises selecting velocity functions using one or more of the sets of one-to-one correspondences, associating velocity values with a set of (t,x) values of such one-to-one correspondence sets and displaying such velocity values in the T-X domain for assessing quality of velocity picks. According to a further aspect, one or more of the sets of one-to-one correspondences can be displayed in the T-X domain for stratigraphic and structural interpretation of the subsurface. According to yet further aspects, one or more of the sets of one-to-one correspondences can be used for generating interval velocity displays of the subsurface.

According to another aspect of the invention, there is provided method and apparatus for geophysical exploration comprising providing a set of data points {(t,x)} obtained from seismic traces, the data points distributed at discontinuous intervals X along the seismic line. The set comprises points (t,x) where t is in a time domain and x is in a spatial position along the seismic line domain. Then, subsets E {(t,x)} are linked together from the set {(t,x)} by searching the dataset on a trace basis and by generating a linking function.

According to further aspects, this linking function can be used to link together subsets (t,x) of stacked seismic sections or to link together (T,X) values of (T,V,X,C) or (T,V,X,C') velocity spectra data. In any event, the picks, the event segments produced by linking together such picks, and the horizons produced by linking together such event segments, can be displayed in a T-X domain display for stratigraphic and structural interpretation.

DETAILED DESCRIPTION OF THE INVENTION

The method and apparatus of the invention are directed to processing a set of regional coherency peaks {(T,V,X,C')} such as produced from a set of velocity spectra data {(T,V,X,C)} at a plurality of locations X along a seismic line.

The set of velocity spectra data {(T,V,X,C)} can be produced using velocity spectra techniques such as those described above or otherwise available to those skilled in the art or their equivalents. Software is commercially available for such analysis and suitable techniques are also well known. Further description is therefore not necessary. This step is illustrated as steps A and B in FIG. 8 which illustrates that typically seismic traces are sorted into common midpoint gathers and then velocity analysis is conducted on the common midpoint gather traces to generate (T,V,X,C) data for selected CMP values. In accordance with the invention, it is preferred that the selected CMP values include all or nearly all of the CMP values along the seismic line.

From the {(T,V,X,C)} data, a subset {(T,V,X,C')} of data can be selected manually or by using a suitable algorithm for detecting locations of regional coherency peaks (T,V,X,C') or by combining manual and machine picking. Such programs can be readily produced by defining regions in the T-V domain of velocity spectra based on increasing coherency values therein relative to lower coherency values between defined regions, and then selecting the location (T,V) of coherency peaks C' in each region for velocity spectra at locations X along a seismic line. Such picking programs are commercially available or can be generated by the skilled programmer from the description herein and need not be described in detail.

Figure 1A:
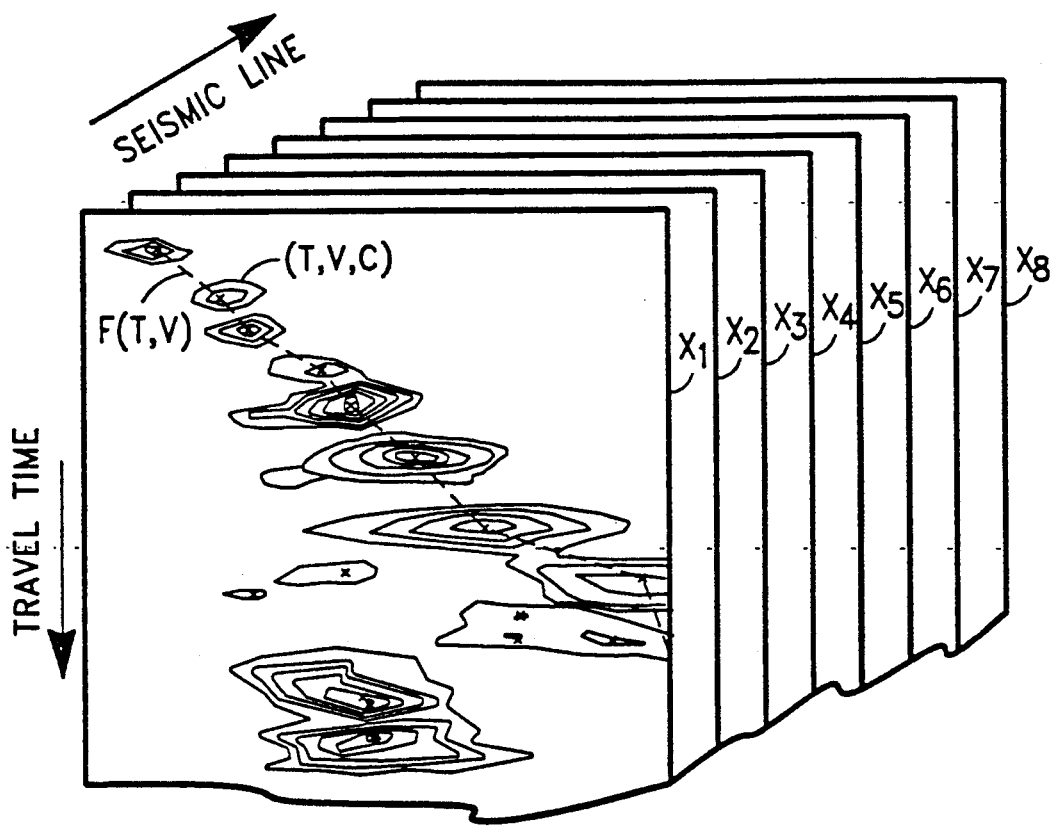
FIG. 1A illustrates velocity spectra having. (T,V,C) data plotted therein at positions X along a seismic line of exploration. Coherency values C are contoured in the T-V domain.
Figure 1B:
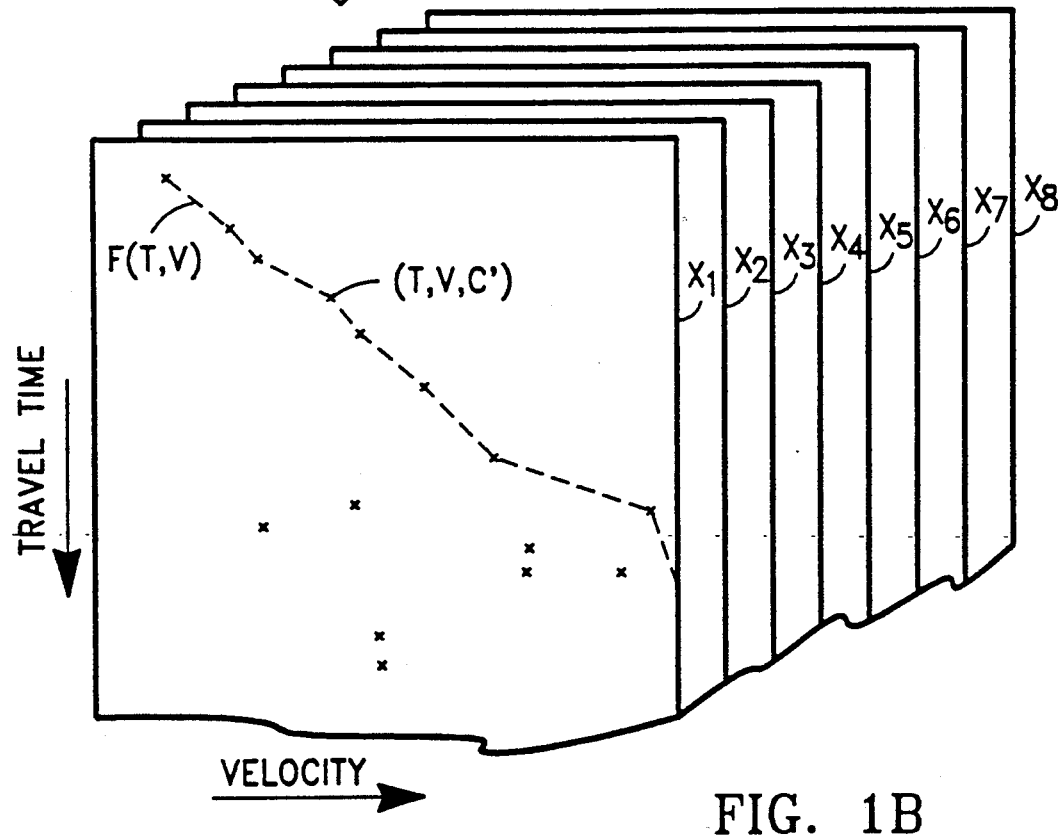
FIG. 1B illustrates that velocity spectra data (T,V,C) at positions X can be condensed to a set (T,V,C') by retaining only regional coherency peaks (T,V,C') at positions X along a seismic line of exploration.
Figure 8:
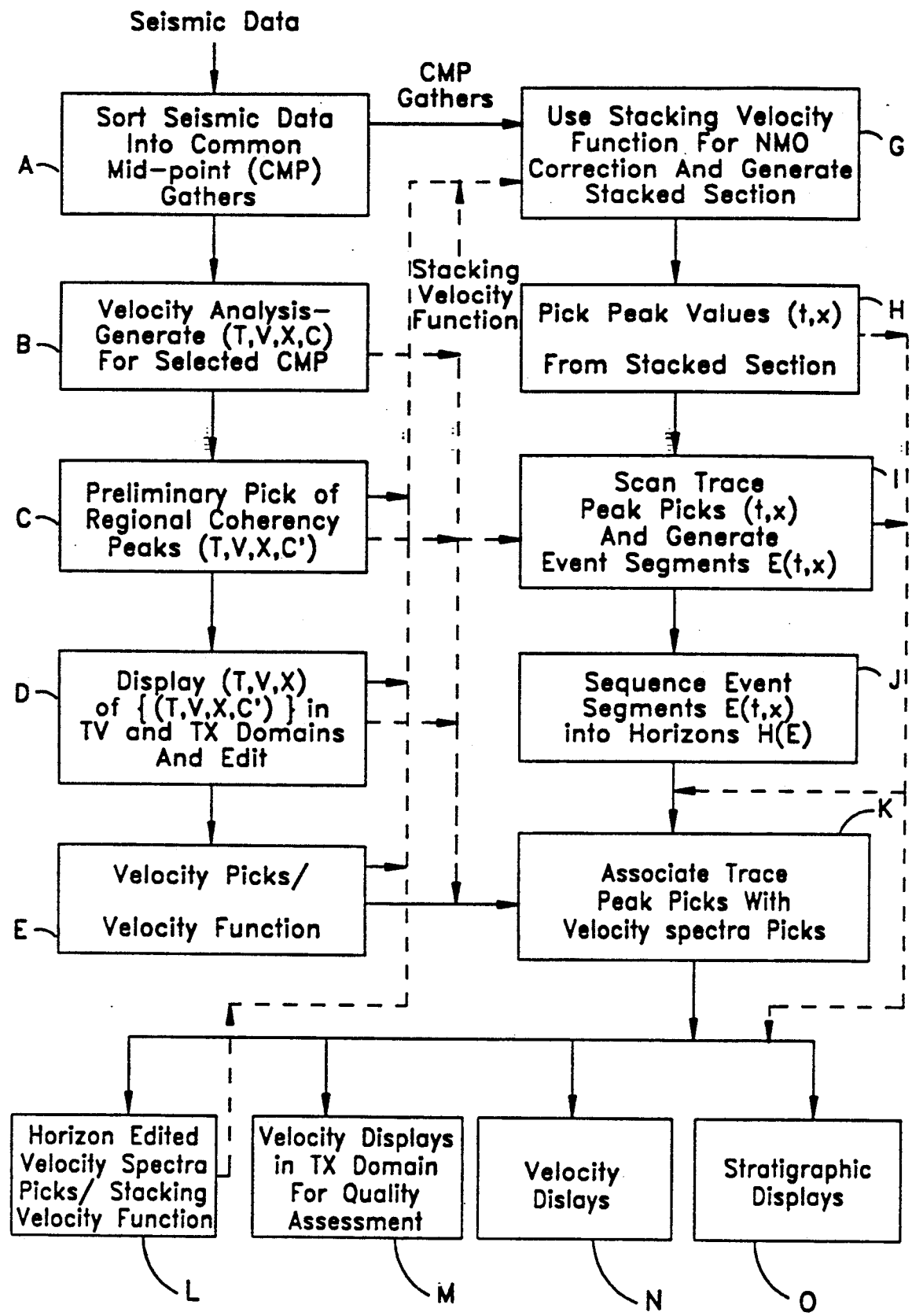
FIG. 8 illustrates methods for processing seismic data in accordance with the invention.

The step of picking regional coherency peaks (T,V,X,C') is illustrated in the drawings by the arrow connecting FIGS. 1A and 1B and by step C of FIG. 8. It can be seen from FIGS. 1A and 1B that the effect of this picking step is significantly to reduce the quantity of data for processing to a fraction as low as 1% or less of the original data set. Use of this reduced data set {(T,V,X,C')} facilitates representing the significant information of a larger {(T,V,X,C)} data set during processing so that it is feasible and preferred to analyze velocity spectra produced at close or even at every interval along the seismic line in accordance with the invention.

Each point in the sets {(T,V,X,C)} and {(T,V,X,C')} can be seen from FIGS. 1A and 1B to comprise unique locations (T,V,X) in three-space. Hence, points constituting the {(T,V,X,C')} data set can be uniquely represented in a (T,V,X) coordinate system.

Referring to FIG. 1A, it can be seen that the set {(T,V,X,C)} of data potentially can fill the T-V domain at positions X along the seismic line. By contrast, the set {(T,V,X,C')} as illustrated by FIG. 1B is highly sparse. Referring to FIGS. 1A and 1B, it can also be seen that T,V,C and C' can take on any value in a given range whereas X takes on discrete integral values. The data distributions of T,V,C and C' thus occur on discrete integer values of X. Consequently, the set {(T,V,X,C')} is highly sparse in T,V,X space.

Nevertheless, this highly sparse data distribution in T,V,X space when viewed in T-V, T-X or V-X domains provides a sufficient redundancy of points to be highly useful. In fact, the redundancy of data achieved by using {(T,V,X,C')} from all or substantially all CMP gathers along a seismic line is sufficient that the display of sets {(T,V,X,C')} in the T-X domain (see redundancy of (T,V,X,C') at aa, bb, cc of FIG. 2D) can even be used directly for stratigraphic interpretation. Since the usual tool for stratigraphic interpretation is the stacked seismic section of CMP gathers, this is a result not expected. Moreover, viewing of the sets {(T,V,X,C')} can therefore provide a direct indication of whether further editing of the data will be advantageous before further processing to generate stacked seismic sections, interval velocity displays, and the like; or whether more regional coherency picks should be picked from the velocity spectra. Since the invention contemplates creating a one to one set of regional coherency picks to picked peak events from stacked seismic sections, it will be appreciated that the picked regional coherency peaks should be selected, as is known, to include the primary relections. Thus, displays of {(T,V,X,C')} data are useful in their own right for stratigraphic and processing applications as well as being useful in producing stacking velocity functions, horizon functions, and horizon velocity functions in accordance with the invention.

The advantages of displaying regional coherency picks in a selected domain can be further appreciated by considering that the result of overlaying even a few velocity spectra would be difficult to interpret; whereas, overlaying regional coherency picks can be readily evaluated and interpreted. See FIGS. 1A, 1B, 2C, and 2D.

Figure 2A:
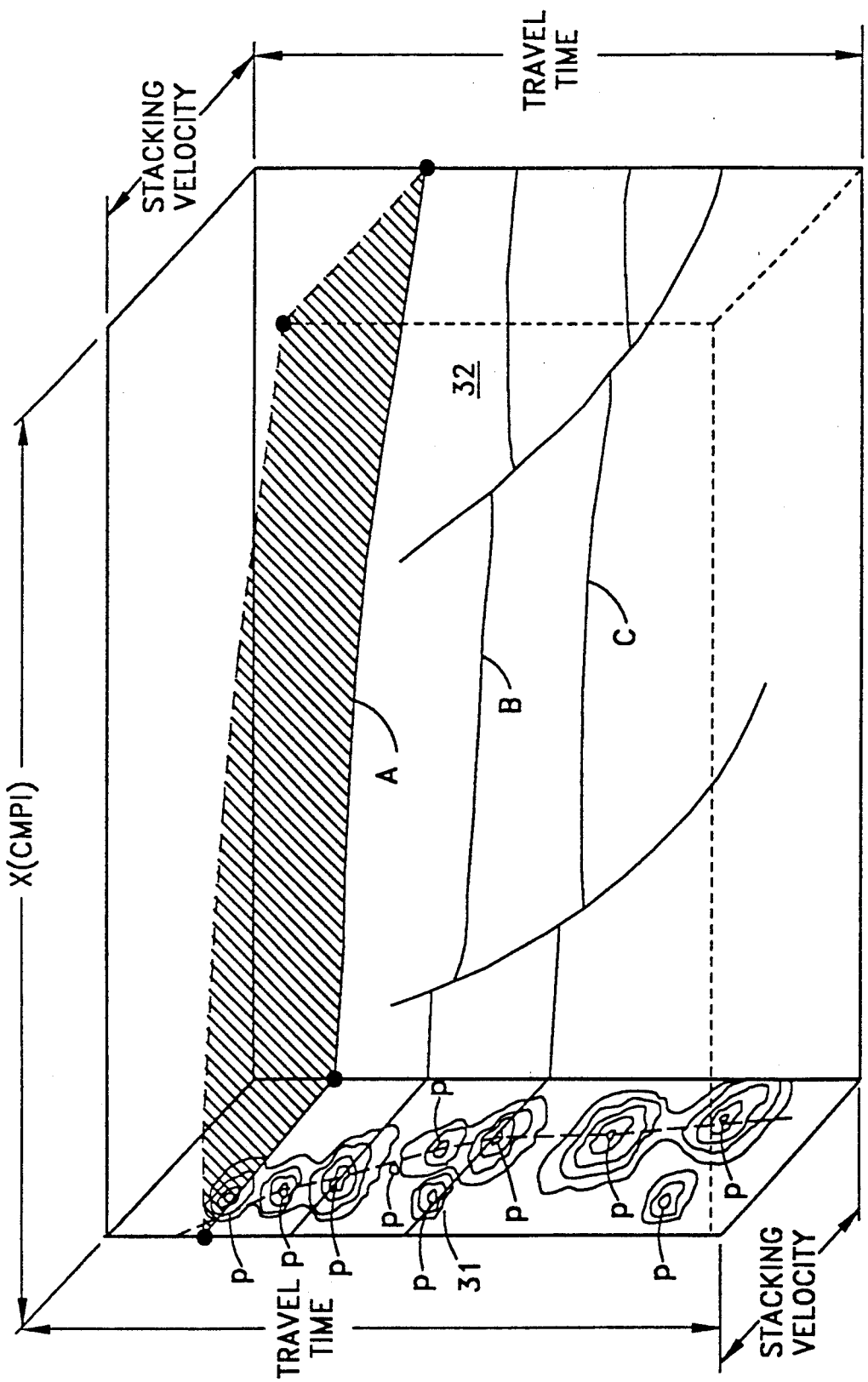
FIG. 2A illustrates schematically the relationship of a velocity spectrum having contoured coherency values to a stacked seismic section.
Figure 2B:
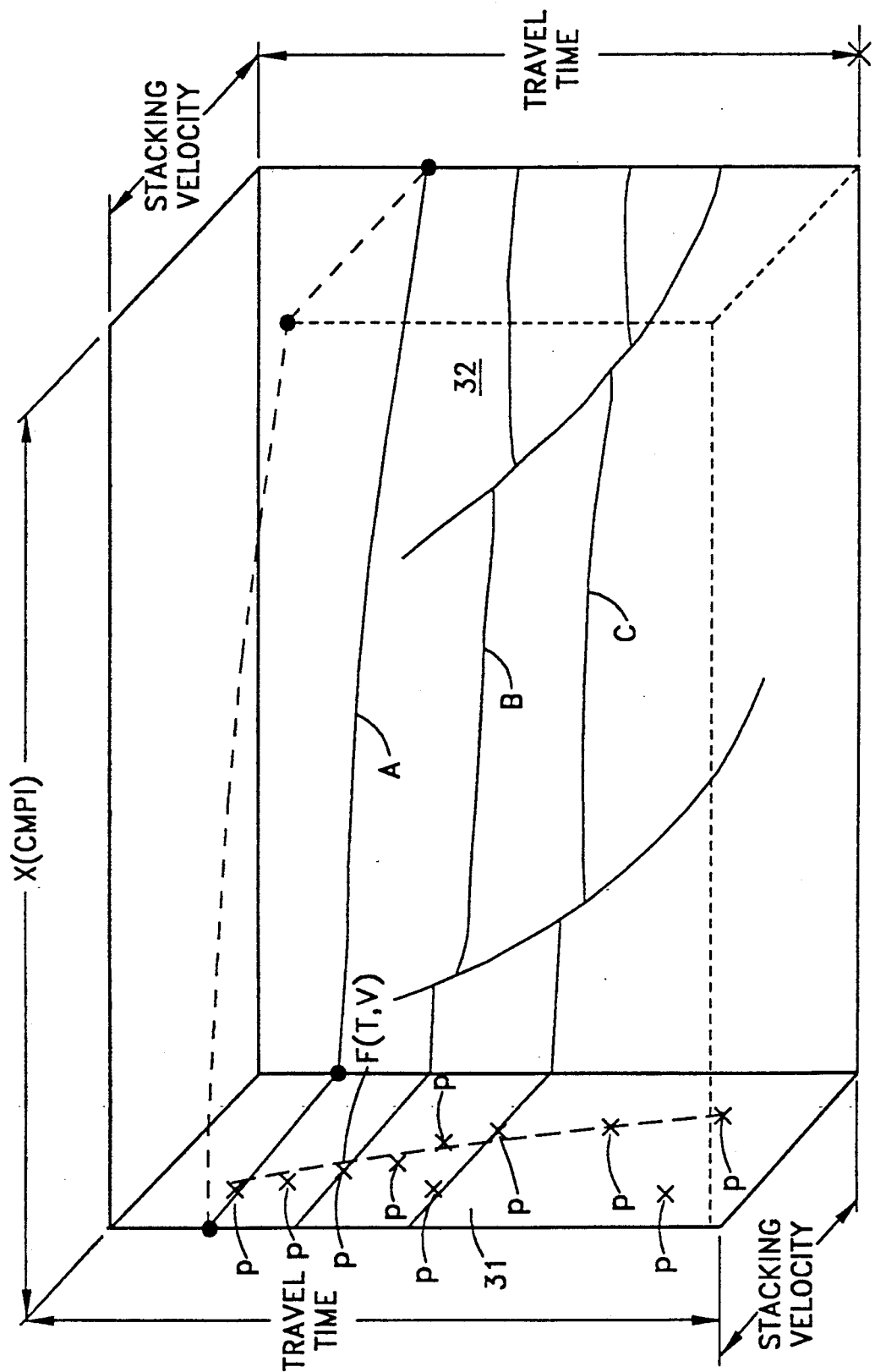
FIG. 2B illustrates schematically the relationship of regional coherency peaks (T,V,X,C') of a velocity spectrum to a stacked seismic section.

Referring now to the drawings in detail and in particular to FIG. 2A, FIG. 2A illustrates schematically the relationship of a velocity spectrum 31 comprising (T,V,X,C) data, with coherency contoured in the T,V domain, to a stacked seismic section 32. FIG. 2B correspondingly illustrates the relationship of a velocity spectrum 31 comprising regional coherency peaks p to a stacked seismic section 32. Both FIGS. 2A and 2B are illustrative of relationships between stacked sections and velocity spectra. However, stacked sections are not produced directly from velocity spectra but from stacked CMP gathers, (see, for example, FIG. 3A which shows a portion of a stacked seismic section of CMP gathers).

In FIG. 2A, velocity spectrum 31 is a display of trial stacking velocity V as a function of travel time T with a contoured display of coherency or semblance C for a particular location X or common mid-point location index (CMPI) along the seismic line. Each point contoured on the spectrum is therefore a point (T,V,X,C). Such velocity spectra can be produced by techniques known to those skilled in the art and can even be produced using commercially available software.

Preparation of velocity spectra can be illustrated by reference to steps A, B, C, D, E, and G of FIG. 8. Typically, step A sorts seismic data into CMP gathers, and step B generates velocity spectra (T,V,X,C) data. Step C selects the regional coherency maxima (T,V,X,C') and produces a set {(T,V,X,C')}. The regional coherency peaks (T,V,X,C') can be picked in step C before or after fairway editing (not illustrated) as is known to those skilled in the art. Steps A, B, and C are individually known to those skilled in the art.

Figure 2C:
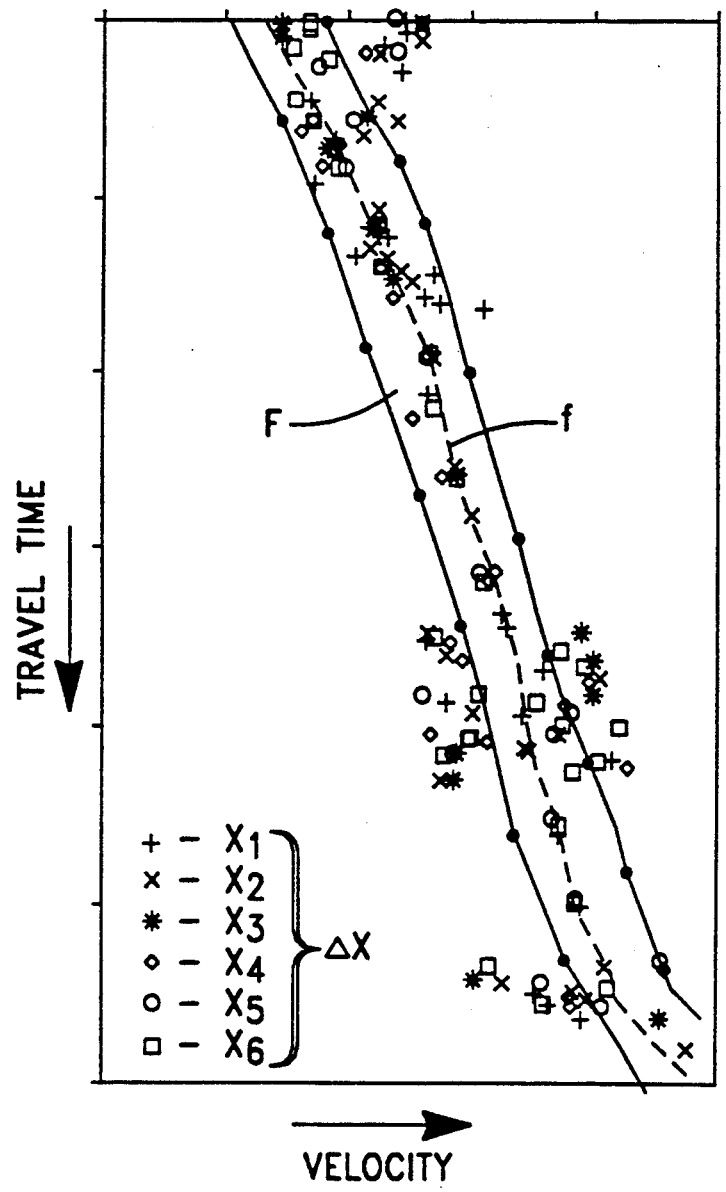
FIG. 2C illustrates that a set of {(T,V,X,C')} can be displayed in a T-V domain and fairway edited to further restrict the set of data to values within a T-V fairway.

Preferably, the {(T,V,X,C')} data can be displayed in the TV and TX domains and a data fairway can be selected in one or both domains to exclude multiples and other nonprimary reflecting horizon events (step D). Referring to FIG. 2C, it can be seen, by projecting or displaying a set {(T,V,X,C')} over a range of X in a TV domain, that a reinforcement of overlapping peaks occurs which can be used by the explorationist to select a stacking velocity function f as shown. Fairway editing (see fairway F) can also be applied to data using such displays. Fairway editing as such is known but is not believed to have heretofore been applied using displays and data presentations as illustrated in FIGS. 2C and 2D.

In a like manner, a set {(T,V,X,C')} can be displayed in the T-X domain and edited. Referring now to FIG. 2D, FIG. 2D illustrates a display of a set {(T,V,X,C')} of data in a T-X domain. It can be seen horizons are visible even in this display of {(T,V,X,C')} data and therefore that such displays can be used for stratigraphic interpretation. It will also be appreciated that numerous nonhorizon events are present. The nonhorizon events can to some extent be removed by fairway editing using displays such as FIGS. 2C and 2D. The fairway editing skills necessary for such editing are possessed by those skilled in the art; however, it is believed that such fairway editing has not heretofore been applied to TV and TX displays of sets of coherency peaks {(T,V,X,C')}.

After editing, the velocity spectra peaks (velocity picks) used for generating the stacking velocity function can be selected (step E) thereby generating a stacking velocity function for use in step G for generating a stacked seismic section. For example, in the TV domain, selected coherency peaks (T,V,X,C') linked by interpolation or other function can be used to define the stacking velocity function. Referring to FIG. 1B, it can be seen that a stacking velocity function F (T,V) can be generated by user identifying a set of peaks {(T,V,X,C')} and interpolating between selected points as illustrated by the dashed line to produce the function. See also velocity stacking function f in FIG. 2C illustrating that slices $\Delta X$ of overlapping {(T,V,X,C')} data from a number of X values-along the seismic line can be effectively used for producing a stacking velocity function. Alternatively, curve fitting functions can be used to connect selected picks and to produce the stacking velocity function. FIG. 2C illustrates a projection on to a T-V domain of {(T,V,X)} data from six adjacent X locations. Similar displays of (T,X) couples and (V,X) couples in the T-X (see FIG. 2D) and V-X (not illustrated) domains can similarly be produced from the {(T,V,X,C')} data and use for editing. As will be appreciated by those skilled in the art it may be necessary to generate stacking velocity functions at intervals along the seismic section to fully take into consideration velocity variations along the line. It may therefore be desirable to display stacking velocity functions taken at intervals on the line in a single display of overlapping stacking velocity functions to determine the variation in velocity along the line and the need for more frequent generation of functions.

Figure 2D:
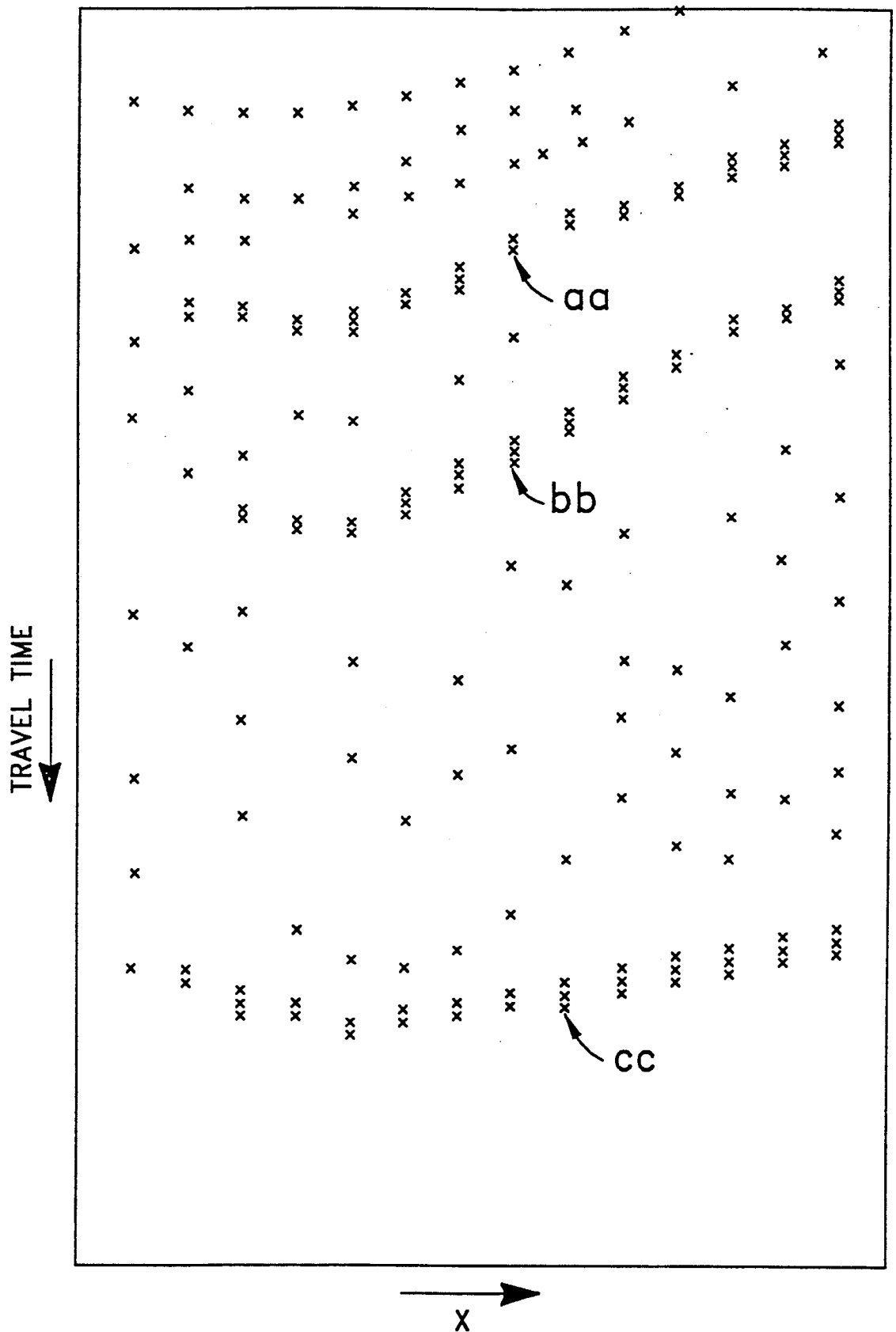
FIG. 2D illustrates that a set of {(T,V,X,C')} can be displayed in a T-X domain and fairway edited to restrict the set of data to values within a T-X fairway.

While displays in the T-V, T-X, and V-X domains can be based on a single value (or slice) of X, V, or T, generally, it is preferred that a range of values $\Delta X$, $\Delta V$, or $\Delta T$ be projected onto the T-V, T-X, V-X domains as illustrated in FIGS. 2C and 2D. In the X domain, the (T,V,X,C') of 2 or more X values can be used; in the V domain, the (T,V,X,C') of up to a third or more or even all of the V values may be displayed in the T-X domain.

It will be appreciated that projecting a range $\Delta X$ of values onto the T-V domain is as simple as selecting a subset $\Delta X$ (T,V,X,C') in a selected $\Delta X$ along the seismic line and displaying the points (T,V) of that set in the T-V domain and representing associated X, C', or both, using, for example, color. Likewise in the T-X domain, a subset delta V(T,V,X,C') in a selected range of delta V can be displayed in the T-X domain by displaying the point T,X of that set and assigning color or other visual values to V and C' as desired. Such can readily be accomplished by the skilled programmer or computer user.

It will be apparent that such displays will be useful in fairway editing the {(T,V,X,C')} dataset. Thus, a fairway F can be defined where reinforced data points occur as illustrated by specifying a region in the T-V domain and including only {(T,V,X,C')} data points falling within that fairway.

Referring now to FIG. 2D, it can be seen that subsets $\Delta V$ {(T,V,X,C')} can analogously be determined and displayed in the T-X domain.

By displaying such subsets $\Delta V$ across a range of values V it will be seen that the resulting redundancy of points causes horizons aa, bb, cc to become reinforced and more apparent. Then, by restricting the {(T,V,X,C')} dataset to events associated with such horizons an editing of the dataset can be accomplished.

By iteratively producing displays such as 2C and editing and producing displays such as 2D and editing, smaller subsets {(T,V,X,C')} can be obtained which increasingly represent the reflecting horizons in the subsurface. This step is referred to in FIG. 8 as step D.

Referring again to FIGS. 2A and 2B, stacked seismic section 32 schematically illustrates the result of stacking, for example, CMP gathers, for display in the travel time seismic line location domain (T-X domain). For simplicity, only certain horizons are illustrated. Such displays can be produced using estimated stacking velocity functions or can be produced conventionally or can be produced in accordance with the invention as herein described.

Referring again to the T-V domain 31, it can be seen that regional coherency peaks (T,V,X,C') occur at locations p and that certain of these peaks p correspond to horizons in T-X domain 32 and that certain points p do not. It will be appreciated that other velocity spectra at intervals X along the seismic line also have coherency peaks associated with the illustrated horizons. In determining a stacking velocity function for NMO correction and for interval velocity interpretation, optimally only those peaks which correspond to horizons will be taken into consideration. Other coherency peaks representative of constructive interference such as from multiple reflections, diffraction and refraction events will not be considered.

However, relating the coherency peaks (T,V,X,C') of velocity spectra to events on stacked sections is not a trivial task. Frequently, points p on the velocity spectra do not relate and both velocity spectra and stacked sections are replete with spurious events.

In accordance with the invention, method and apparatus are provided for using the information in stacked seismic sections to select only those coherency peaks in velocity spectra which are in close proximity to reflection horizons on the stacked seismic section. This procedure produces more accurate picks of coherency peaks and resulting stacking velocity functions and more importantly relates them to reflection horizons which are the fundamental features mapped in the search for hydrocarbons. The approach provides more accurate stacking velocity functions and therefore interval velocities and directly relates them to mappable events, thus improving structural and stratigraphic interpretations.

Figure 3C:
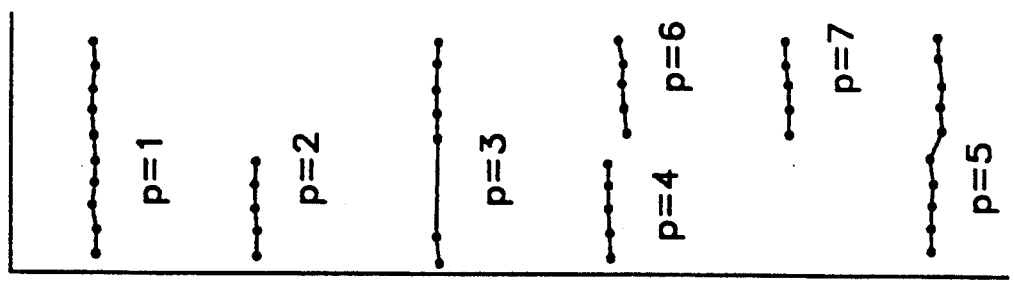
FIG. 3C illustrates schematically horizon event segments $E_p\{(t, x)\}$ sequenced from seismic event picks on FIG. 3B.
Figure 3B:
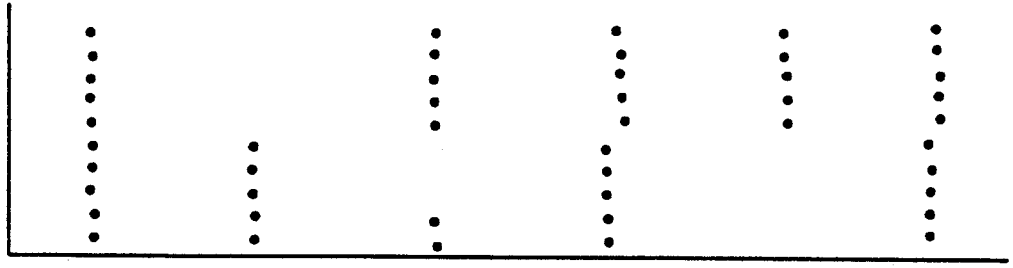
FIG. 3B illustrates schematically seismic event picks (t, x) corresponding to horizons on FIG. 3A.
Figure 3A:
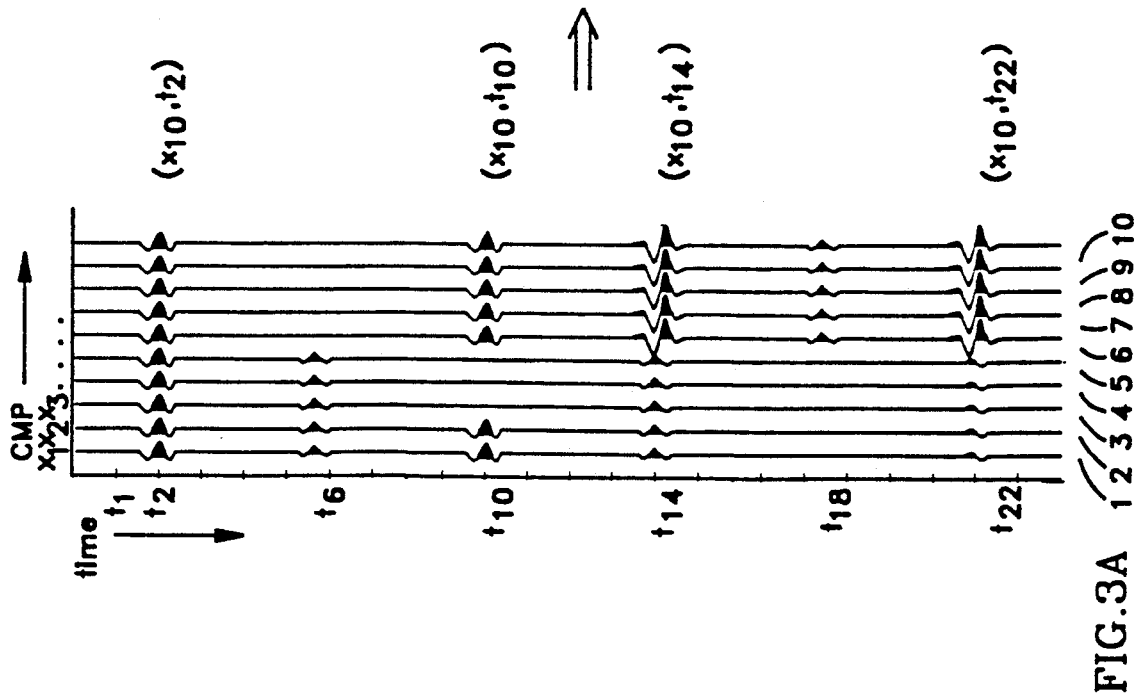
FIG. 3A illustrates schematically a portion of a stack of CMP gathers.

Referring now to FIGS. 3A, and 3B, FIG. 3A represents schematically a portion of a stacked seismic section and FIG. 3B illustrates schematically seismic event picks (t,x) corresponding to horizons on FIG. 3A. FIGS. 3A and 3B together illustrate a method for machine picking seismic events (t,x) contributing to horizons on a stacked section of seismic traces. It will be appreciated that the effect of picking events (t,x) contributing to horizons on FIG. 3A, thus producing a data distribution {(t,x)} as illustrated in FIG. 3B is to render the seismic section data highly sparse just as the effect of picking regional coherency peaks (T,V,X,C') renders the {(T,V,X,C')} set highly sparse. The result of both picking procedures is to condense each dataset to its most significant elements and to facilitate processing and interpretation.

Referring to FIG. 3A, it can be seen that horizons appear to exist at travel times $t_2$, $t_6$, $t_{10}$, $t_{14}$, $t_{18}$ and $t_{22}$ for traces 1–10 corresponding to CMP locations $x_1$ to $x_{10}$. Such traces can be machine processed in accordance with the invention to select and provide a record of seismic events {(t,x)} contributing to respective horizons.

For example, each trace can be scanned in analog form and peak events can be selected and identified by trace number x and travel time t to provide a set {(t,x)}. Preferably, the traces are digitized traces and the selection is accomplished by a programmed data processor.

Not all events nor all possible horizons will be of interest for all applications of the invention. For example, only the strongest signals or only signals occurring at certain user selected windows of travel times may be of interest. Preferably, the user or a default specification in the program controlling a computer can, therefore, specify which events will be picked. This amounts to establishing a machine useful criterion for picking events, for example, the n strongest event peaks, event peaks having a value greater than n, peaks occurring in specified travel time ranges, and the like. Such criteria can be readily implemented on a computer. For example, using a criterion of selecting the n strongest event peaks, a procedure can for each trace store the first n peak count values and then replace the lowest peak event value each time a higher peak event value is encountered. At the end of scanning each trace, the n highest values will be stored. Alternatively, all of the peak values can be retained and sorted and only the n highest values retained. A criterion of selecting seismic event values above a minimum threshold or occurring in certain travel time ranges or the like can also be readily specified. In picking trace peaks, either positive lobes or negative lobes can be used or various combinations. Picking peaks (t,x) from seismic sections can be readily implemented by those skilled in geophysical applications programming and need not be further described here.

As indicated, each selected seismic stack peak pick event contributing to horizons can be characterized by its (t,x) coordinates and stored. Displays of such records, as shown in FIG. 3B, can be used for determining whether further threshold or criterion constraints might advantageously be used in picking trace peaks from picked sections, i.e., the user can evaluate whether the significant events appear to be selected by the criterion and change the criterion to select or reject more seismic event peaks as desired.

The step of picking peak events (t,x) contributing to horizons on a stacked section is illustrated as step H on FIG. 8.

Picked peak events (t,x) can be sequenced in accordance with the invention into horizon event segments E {(t,x)} comprising two or more such events and spanning two or more traces. This step is illustrated by FIG. 3C, FIG. 4, FIG. 5 and is illustrated as step I on FIG. 8.

While the steps of sequencing events (t,x) into event segments and into horizons is illustrated primarily in reference to peak events (t,x) from stacked seismic sections of CMP gathers, it will be apparent from comparing FIG. 3B and FIG. 2B that the procedures described can also be used for (T,X) data of the {(T,V,X,C)}, and {(T,V,X,C')} sets as illustrated in FIG. 8 by the dashed line connecting steps B, C, D and E to step H.

The step of sequencing events (t,x) into event segments E {(t,x)} comprises determining events (t,x) on adjacent traces which meet travel time criteria preferably determined by adjacent picked events on previously scanned traces. It will be apparent that it will usually not suffice to merely specify a range of travel times if the sequencing is to be performed automatically by machine. Rather, a travel time sequencing function which changes in response to changes in a horizon, that is which "learns" from previous picked events, is advantageous. Also, it is advantageous to provide a sequencing procedure which will terminate an event segment, and start others as appropriate, when events on successive adjacent traces do not meet the requirements of the travel time sequencing function. In this way, the likelihood of constructing artificial horizons which do not correspond to subsurface structure can be reduced.

Figure 4:
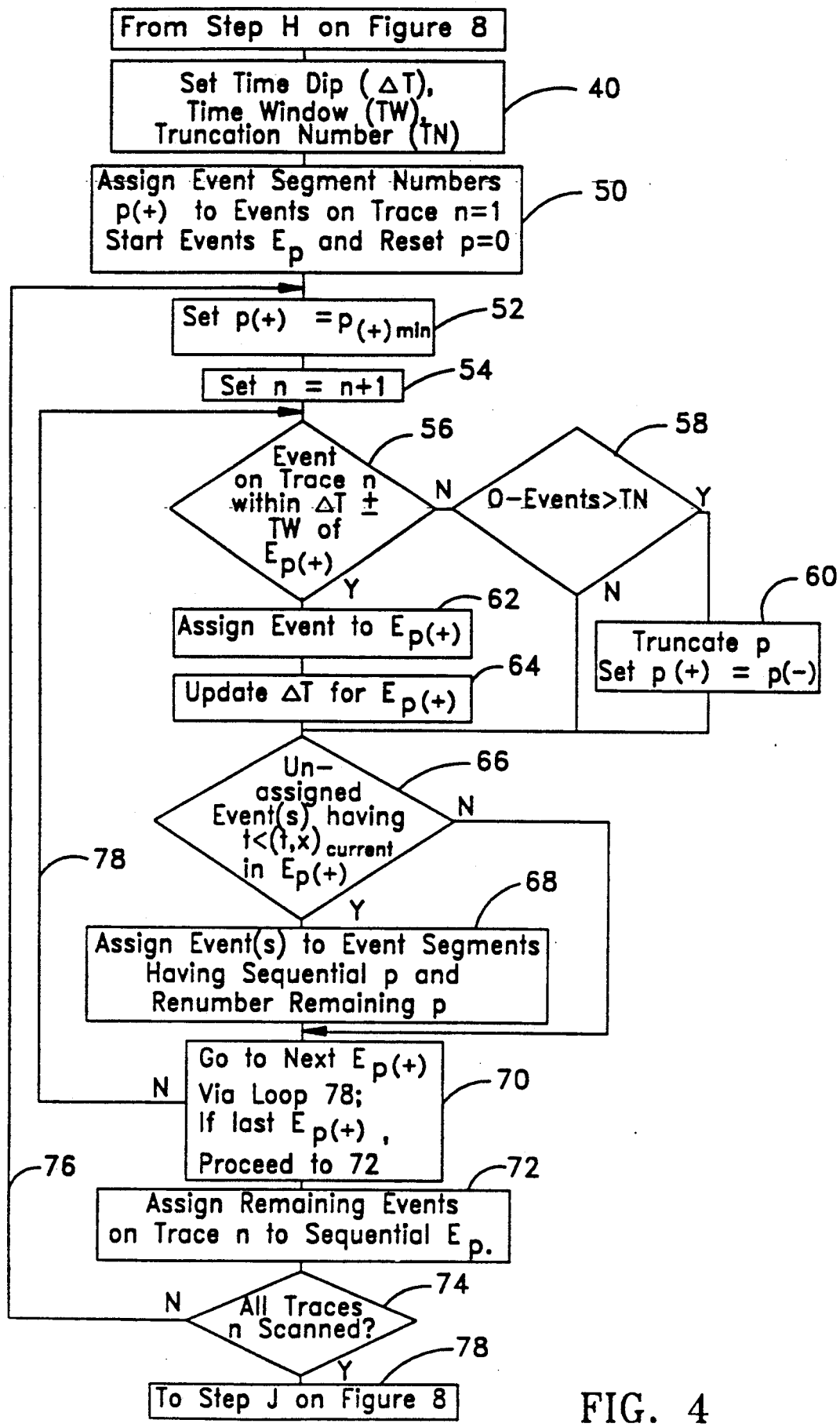
FIG. 4 illustrates a flowchart for sequencing seismic event picks {(t, x)} into event segments $E_p\{(t, x)\}$.
Figure 5:
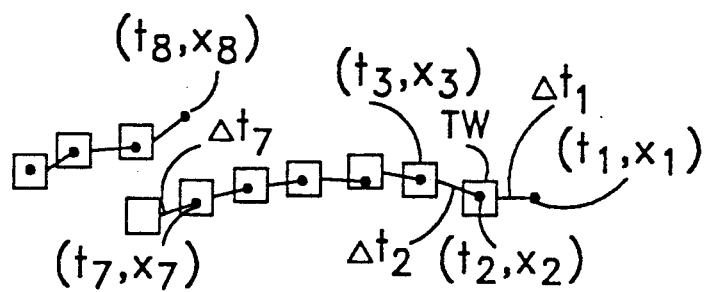
FIG. 5 illustrates a method for assigning seismic event picks {(t, x)} to horizon event segments $E_p\{(t, x)\}$ using scan windows and time-dip functions.

The principle of a procedure in accordance with the invention for sequencing event picks (t,x) into event segments E {(t,x)} is illustrated by FIG. 4 in which event picks (t,x) on adjacent traces are represented by dots and scanning proceeds from right to left. It is noted that scanning can proceed from left to right as illustrated by FIGS. 3A, 3B, 3C or from right to left as illustrated in FIG. 4. A learning travel time sequencing function can be provided by associating with each event (t,x) a parameter representative of the expected change in travel time between adjacent traces associated with it (expected time dip per trace, symbolized $\Delta t$). If the travel time of an adjacent event (t,x) is within a time window TW i.e., $\pm$ a selected time interval relative to t of an event (t,x) previously or just assigned to the event segment E {(t,x)}, then the adjacent event can be assigned to the same event segment. Thus, referring to FIG. 5, $(t_1, x_1)$ has a $\Delta t_1$ function associated with it which determines the time window TW within which an event $(t_2, x_2)$ must occur for $(t_1, x_1)$ and $(t_2, x_2)$ to be associated in a single event segment. It will be noted that event $(t_2,x_2)$, falls within but is not centered in TW, and that TW is determined by (centered on) the end point of $\Delta t$. TW thus constitutes an error or tolerance so that the adjacent trace is searched at a time location $t + \Delta t \pm TW$ for events which might be assigned to the same event segment.

$\Delta t$ can be updated as each (t,x) pair corresponding to a peak event is assigned to a given event segment E (t,x) by using the actual change in time $\delta t$ between two adjacent events as the $\delta t$ which determines the time window TW for the next trace. It will be appreciated, therefore, that there are two time dip functions for each assigned event, a predicted $\Delta t$ function and an actual $\delta t$ function. By using the actual $\delta t$ function for a previously assigned peak (t,x) as the predicted $\Delta t$ for the next trace, the $\Delta t$ function "learns" from events previously assigned to an event segment. $\Delta t$ can be initially set by the user or by default programming specification and thereafter updated as indicated using the actual $\delta t$ value or, for example, updated as a running average of a selected number of $\delta t$ of preceding adjacent traces. As each event is assigned to E, a set E $(t,x,\delta t) = \{(t_1, x_1\ \delta\tau_1), (t_2, x_2\ \delta\tau_2), \ldots (t_n, x_n, \delta\tau_n)]$ is obtained. It will be apparent that this set is fully determined by $E(t,x) = \{(t_1, x_1), (t_2, x_2), \ldots (t_n, x_n)]$, or by $E(t, \delta t) = \{(t_1, \delta t_1, x1), (x2, \delta t_2), \ldots, (t_n, \delta t_n)]$ where each delta t is for adjacent x and the first x value of a horizon event segment is known, that is by (time, location) couples or by (time, time dip couples). Accordingly, it will be appreciated that the event segment can be stored during processing as E {(t,x)}, or as E {(t,$\delta$t)}, without loss of significant information and the remaining value x or $\delta t$ determined by calculation later.

As illustrated, no event pick occurs in TW determined by (thd 7, $\Delta t_7$). This is a zero or null event and may or may not be indicative of termination of a horizon event segment. Thus referring to FIG. 3A, at $t_{10}$ on traces 3, 4, 5, no events (null events) occur. Yet, there appears to be a horizon at $t_{10}$. Hence, it is preferred that some preselected number of null events on adjacent traces be exceeded before an event segment is terminated.

Referring again to FIG. 5, a second event segment is illustrated as starting at $(t_8,x_8)$. These two event segments may or may not be part of the same subsurface horizon. As discussed below in reference to FIG. 6, it is preferred to let the user specify which event segments are assigned to each horizon.

Referring now to FIG. 4, FIG. 4 illustrates a procedure for a sequencing peak picks (t,x) into event segments E {(t,x)}.

As illustrated, at step 40, a predicted time dip delta t, a time window aperture TW and a number (truncation number) TN of adjacent null events required for terminating an event segment can be user or default programming specified.

As illustrated at step 50 a programmed data processor can scan a first trace, for example, trace 1 at $x_1$ on FIG. 3B and can assign event segment numbers p=1, 2, 3, 4, 5 to the events illustrated. See FIG. 3C.

As illustrated at steps 52, 54 and 56 in FIG. 4, the data processor can then start with the lowest p-numbered event segment, that is p=1, and can scan an adjacent trace n=n+1 for an event in time window TW at a time location on the next trace determined at t+Δt ±TW where t is the t value of the event assigned to event segment p=1. If an event (t,x) occurs on the next trace within the time window, then as illustrated at steps 62 and 64, the event is assigned to p=1 and the Δt is updated.

Step 66 can scan the trace for unassigned events (none in the case of trace 2 on FIG. 3B) above the location of p=$_1$, that is, having a time less that the t of the (t,x) pair just assigned to the event segment. If such unassigned events occur, step 68 would sequentially assign such events to $p_2$ and to sequential p's and renumber the remaining p's. Step 70 can then evaluate whether the trace has been scanned for all previously assigned p-numbered event segments and loop 78 continues to cause scanning of the second trace to continue until all p-numbered event segments are tested for. Step 72 causes any remaining unassigned events on a trace to be assigned to sequential higher numbered p-numbered event segments after all previously assigned p-numbered segments have been scanned. Step 74 tests for whether all traces n have been scanned and, if not, loop 76 returns the process to step 52 to start scanning of the next trace again a the lowest value p-numbered event.

By referring to FIGS. 3B, and 3C, it can be seen that for trace 2 all events correspond to event segments established for trace 1. At traces 3, 4, 5 it can be seen that null events occur at $t_{10}$ corresponding to the event segment numbered p=3. Likewise at $t_6$, null events occur on traces 6, 7, 8, 9, 10. Referring to FIG. 4, when null events occur, step 58 tests for whether the number of null events on adjacent traces exceeds the truncation number TN. For example, assume that the truncation number TN is 4, then null events must be detected on four adjacent traces before an event segment E is terminated. Thus, for traces 3, 4, 5 at $t_{10}$, null events are detected, but do not exceed four. Hence, when at trace 6 an event is detected, the trace 6 event is assigned to it and intervening events for traces 3, 4, 5 can be determined by interpolation using t values (since the intervening X values are known) and the resulting calculated (t,x) couples can be assigned to event segment p=3.

By way of contrasting example, when null events are detected on traces 6–10 at $t_6$, a TN of 4 is exceeded and p=2 is terminated (truncated) by step 60. A flag, for example, (−) is then associated with the event segment to distinguish truncated event segments from nontruncated event segments (+). In case events later occur at similar times to those of the truncated event segment, those events will be detected as new events and assigned to event segments having new p-numbers.

Referring now to events at $t_{18}$ on traces 6–10 in FIGS. 3A, 3B, 3C, the procedure of FIG. 4 will assign the event on trace 6 to a new trace segment p=7 by step 66 and subsequent adjacent events will in due course be assigned thereto by the procedure of FIG. 4. In case of creation of new event segments p, the Δt can be determined in various ways, for example, by the current value of δt for the closest event segment, by interpolating between δt values of event segments above and below the event (t,x) being tested, by preset values or by default specifications and the like.

Referring again to FIG. 8, step J sequences event segments E (t,x) into horizons H (E). This step is illustrated in more detail by FIGS. 6A and 6B.

Figure 6A:
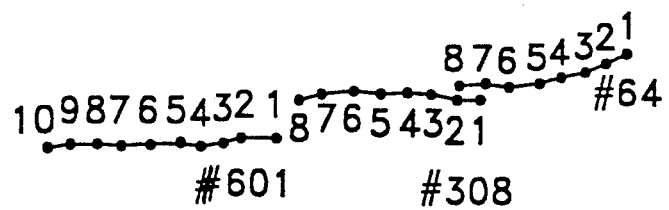
FIGS. 6A and 6B illustrate concatenating horizon event segments $E_p\{(t, x)\}$ into horizons H(E).
Figure 6B:
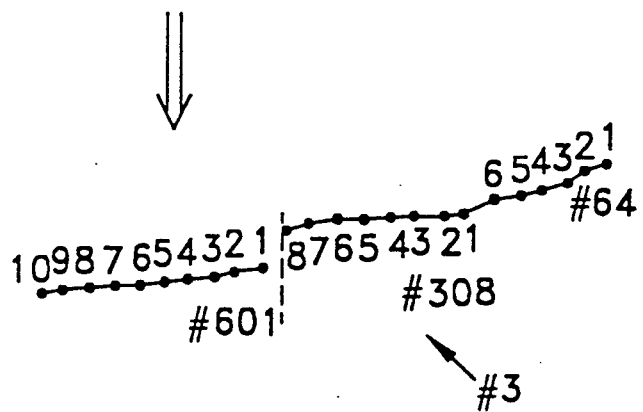

FIG. 6A shows three event segments, #64, #308, #601 which may or may not be part of a single horizon. The user may interpret, for example #64 and #308 as belonging to a single horizon #3, separated by a fault (illustrated by dashed line) from horizon #601. The data processor can be programmed to combine user specified event segments E {(t,x)} or E {(t,δt)}, where the initial x value of the segment is known and delta t's are for sequentially adjacent x values, or E {(t,x,δt)} into horizons H (E) and to connect, for example, event 1 of segment 308 to event 6 of segment 64. This step of combining event segments is illustrated by the arrow connecting FIGS. 6A and 6B. Alternatively, segment 601 might be interpreted as belonging to the same horizon, albeit disjointed by a fault, as that of segments 308 and 64.

Referring again to FIG. 8, step K can associate trace peak picks from any of steps H, I, J with velocity spectra picks from any of steps C, D, E. The associating step can be illustrated in more detail by FIGS. 7A and 7B.

Figure 7A:
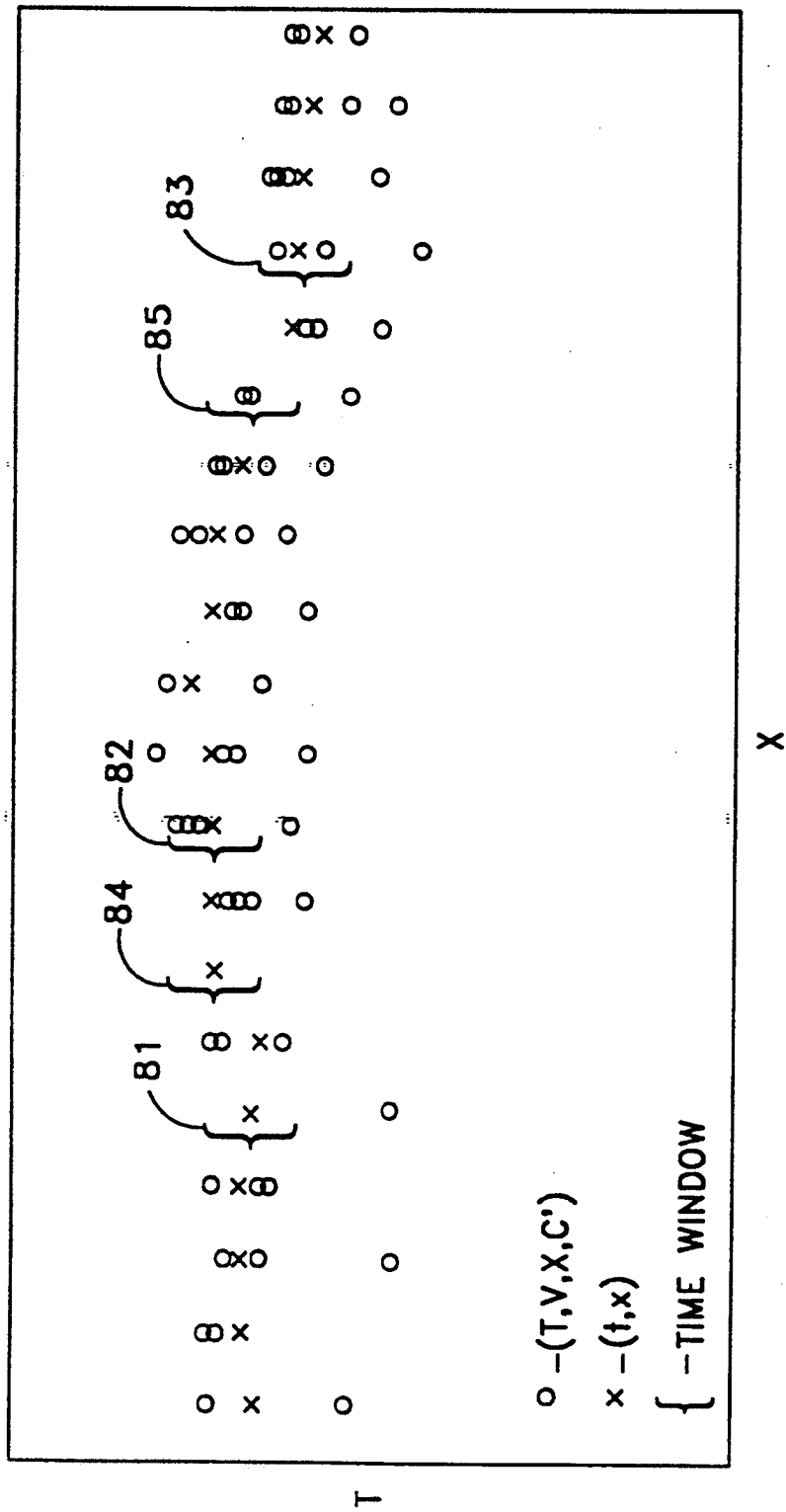
FIGS. 7A and 7B illustrate associating trace peak events (t, x) with regional coherency peaks (T,V,X,C') of velocity spectra.

FIG. 7A illustrates trace peak picks (t,x) and regional coherency peak picks (T,V,X,C') in a T-X domain.

The trace peak picks (t,x) and the velocity spectra peaks (T,V,X,C') align on values of X corresponding to CMP positions X. See, for example, FIGS. 1A and 1B. Within a selected time window of a trace peak, reference numerals 81, 82, 83 illustrate that there may occur zero, one or two, or more, regional coherency peaks. Reference numeral 84 indicates that no regional velocity spectra peaks may occur at a value of X where a trace peak (t,x) occurs and reference numeral 85 illustrates that no trace peaks (t,x) may occur at a value of X where velocity spectra peaks (T,V,X,C') occur.

Figure 7B:
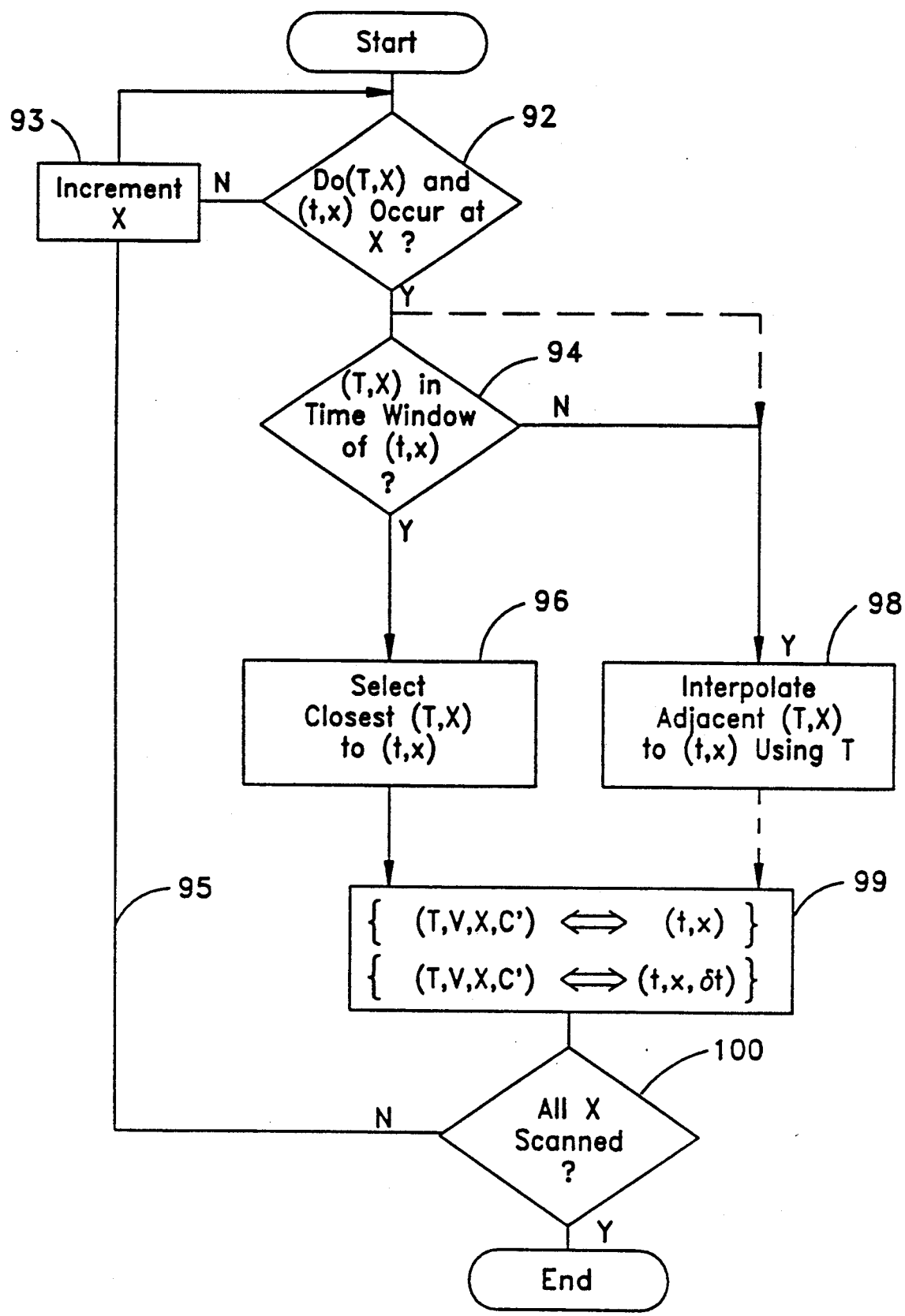

Referring now to FIG. 7B, FIG. 7B illustrates a procedure for associating (T,V,X,C') with (t,x). Thus, step 92 can scan for values of X where both (t,x) and (T,X) occur, (T,X) being simply the (T,X) couple of a (T,V,X,C') regional coherency peak. Where both (T,X) and (t,x) do not occur, step 93 can cause the procedure to increment to the next X (trace or CMP gather) location. Where both (T,X) and (t,x) occur at a value X, step 94 can test for whether the occurrence of (T,X) is within a user or default specified time window of (t,x). If so, step 96 can select the nearest (T,V,X,C') peak to the (t,x) event and associate the two (nearest neighbor procedure). Step 99 then associates the resulting (T,V,X,C') with corresponding (t,x). The procedure continues as illustrated by step 100 and loop 95 until all X are scanned. The result is a set {(T,V,X,C')↔(t,x)} such that for each (T,V,X,C') peak there corresponds one (t,x) event and conversely. Hence, the result of the association step is a one-to-one function relating selected (T,V,X,C') and (t,x). As indicated above, event segments and horizon segments can also be fully determined by (t, δt) values and thus expressed. The result of step 99 can thus also be a set (T,V,X,C')⟷(t, δt)} which is likewise a one-to-one function.

Alternatively, the associating step can proceed as illustrated by the dashed lines in FIG. 7. Thus, where (T,X) and (t,x) occur on the same trace X, step 98 can interpolate between (T,X) values and their associated velocity V and coherency peak values C' as desired, and associate the calculated (T,V,X,C') with the (t,x) pick.

The interpolation and nearest neighbor procedures can be used together as illustrated by the N branch of step 94. According to this aspect of the illustration, the nearest neighbor procedure is used if a (T,V,X,C') point occurs within a preselected range of t bracketing the (t,x) point. Otherwise the interpolation procedure is used. Other comparable procedures can also be used. As indicated, the procedure in addition to associating (T,X) with (t,x) can also be used to associate V values with (t,x) locations.

Referring now to FIG. 8, FIG. 8 illustrates processing seismic data in accordance with the invention.

Generally the invented method and apparatus can be used for generating horizon edited velocity spectra picks and stacking velocity functions (step L), for producing velocity displays in a T-X domain for quality assessment (step M) for producing velocity displays in a V-X domain such as interval velocity displays (step N), and for producing displays in T-X domains for stratigraphic and structural interpretation.

Thus, by associating {(t,x)} from steps H, I, J, with velocity spectra picks from steps B, C, D or E, a set of one-to-one correspondences is produced {(T,V,X,C) or (T,V,X,C')⟷(t,x)}. Since the picked (t,x) values are preferentially those contributing to reflecting horizons in the subsurface, the resulting set of correspondences is a horizon-edited set of picks. This is true whether (t,x) are from stacked seismic sections or from the {(T,V,X,C,) or (T,V,X,C')} data itself in accordance with the invention.

The resulting stacking velocity function from step L can then be used to generate a stacked seismic section in step G and steps H, I, J, K, repeated as desired, to improve editing and quality of the stacked seismic section. By associating velocity values with the resulting {(t,x)} sets, for example from step H, I, or J, or by plotting velocity values of {(T,V,X,C')⟷(t,x)} in a T-X domain, quality of processing can be evaluated and improved.

Futher velocity values can be associated with (t,x) values by a nearest neighbor (T,V,X,C'), by interpolating between adjacent, or between adjacent up and down (T,V,X,C') values relative to (t,x), and the like as illustrated in FIG. 7. Thus, picks (t,x), event segments E {(t,x)}, and horizons H {E{(t,x)}} function as frameworks in the T-X domain with which velocities ca be associated producing horizon velocity functions {(t,x,V)}, {(t,x, delta t,V)}, and the like, and used for generating various velocity displays.

By then displaying velocity variation in the T-X domain either by contouring, assigning color or other visual values, and the like, the quality of the resulting stacked seismic sections can be evaluated.

Since, in the resulting set of one-to-one correspondences, each pick (t,x) has a time dip associated with it, dip corrected interval velocities can be estimated using either Dix's interval velocity equation approach or a linear inverse ray-tracing modeling procedure such as is known to those skilled in the art (step N).

Finally, various displays of the events contributing to horizons such as produced from steps H, I, J, K, can be produced and used directly for stratigraphic and structural interpretation.

The invention will be further understood and appreciated from the following example:

EXAMPLE

Common-shot seismic records are synthetically generated for a model of subsurface structure. Random noise is added to these records and the seismic data is processed through a normal processing sequence producing a stacked section. Velocity analyses are performed on each CMP along the seismic line. Due to the background noise, spurious time-velocity pairs are picked along with the reflection events. A scatter plot of the time-velocity pairs from several closely-spaced CMP gathers is produced and displayed. This display shows that the superposition of time-velocity pairs from the horizons reinforce one another and discriminate against the random noise events. It is apparent from this display (from the densely overlying picks) where the actual velocity picks are located as well as those from the random noise events. A display of the times picked for the time-velocity pairs on all CMPs is displayed in the T-X domain. The continuity of the time events locates the reflectors across this section. Color displays of stacking and interval velocity for these time-velocity pairs are produced and evaluated. Like actual seismic data, the noisy time-velocity pairs have contaminated the interval velocity results.

Returning to the scatter plots, a fairway is selected and used for editing the {(T,V,X,C')} data. The results from this type of fairway editing procedure are displayed and reviewed. Stacking velocity and interval velocity sections are produced. Although the stacking velocity section is improved, the interval velocity results are still poor. However, one can now pick time horizons in a T-X domain and use those time picks to edit the times of the time-velocity pairs of the T-V domain, in accordance with the invention. This editing step yields the improved stacking and interval velocity sections. Thus the selection of the time-velocity pairs based on the association of velocity picks to picked times on the stacked events allows the interpreter to incorporate reflection times, velocity coherency, and lateral stacking velocity continuity into the editing process. The fairway and horizon editing of the time-velocity pairs provides interval velocities suitable for stratigraphic interpretation. Consequently, the time-dip, two-way traveltime, and improved stacking velocity yield suitable interval velocities determined from either Dix's interval velocity equation or linear ray-tracing inverse modeling.

The invention has been described herein as required in terms of preferred embodiments and specific examples. However, the invention is not to be limited thereto but by the claim appended hereto.

What is claimed is:

1. A method of processing seismic data for geophysical exploration comprising:

providing a first set of data points generated from seismic traces;

providing a second set of data points generated from seismic traces;

the second set of data points having a smaller number of data points therein than the first set of data points;

the first and second sets of data points having a common parameter represented by a variable in each of the first and second sets of data points; and editing the first set by associating data points of the first set to data points of the second set according to the variable in each of the first and second sets of data points representing the common parameter and generating a set of one-to-one corresponding data points of the first and second sets, the set of one to one corresponding data points comprising a set of associated data points in which each data point of the second data set is associated with one and only one data point from the first data set.

2. The method of claim 1:

wherein the first set of data points comprises a set $\{(T,V,X,C)\}$ of velocity spectra data produced by velocity analysis of a set of common midpoint (CMP) gathers, each gather having a CMP location X, and the analysis comprising varying travel time T and trial stacking velocity V over a selected range of values, and determining the values of coherency therefor, the dataset therefore comprising a set $\{(T,V,X,C)\}$ of data;

wherein the second set of data points comprises a set $\{(t,x)\}$ of data selected from a stacked seismic section; and wherein the associating step comprises associating the travel times t with values T and generating a set $\{(T,V,X,C) \longleftrightarrow (t,x)\}$ of one to one corresponding $(T,V,X,C)$ and $(t,x)$ data therefrom.

3. The method of claim 1:

wherein the first set of data points comprises a set $\{(T,V,X,C')\}$ of regional coherency peaks of $\{(T,V,X,C)\}$ velocity spectra data obtained by selecting the location $(T,V)$ of regional coherency peaks $C'$ for velocity spectra at locations X along a seismic line;

wherein the second set of data points comprises a set $\{(t,x)\}$ of peak event data selected from a stacked seismic section; and wherein the associating step comprises associating the travel time t with values T and generating a set $\{(T,V,X,C')\} \longleftrightarrow (t,x)\}$ of one to one corresponding $(T,V,X,C')$ and $(t,x)$ data therefrom.

4. The method of claim 3 further comprising:

picking the second set of data points by steps comprising:

establishing a threshold for determining which seismic event shall be machine picked;

machine scanning each trace contributing to a stacked section and picking seismic events meeting the threshold requirements; and characterizing each pick by a $(t,x)$ pair and storing the set $\{(t,x)\}$ as a record of the picks.

5. The method of claim 4 further comprising:

sequencing thus picked peak values $(t,x)$ into horizon event segments E $\{(t,x)\}$ spanning two or more traces;

associating the travel time t of selected horizon event segments E $\{(t,x)\}$ with events T of $\{(T,V,X,C')\}$ dataset and generating a set $\{(T,V,X,C') \longleftrightarrow (t,x)\}$ therefrom.

6. The method of claim 4 further comprising:

sequencing thus picked peak values $(t,x)$ into horizon event segments E $\{(t,x)\}$ spanning two or more traces.

7. The method of claim 6 further comprising:

concatenating event segments E $(t,x)$ into horizons H $\{E\{(t,x)\}\}$; and associating the travel times t of selected horizons H $\{E\{(t,x)\}\}$ with values T of the $(T,V,X,C')$ dataset and generating a set $\{(T,V,X,C') \longleftrightarrow (t,x)\}$ therefrom.

8. The method of claim 6 wherein the step of sequencing picked peak values $(t,x)$ into horizon event segments E $\{(t,x)\}$ spanning two or more traces comprises:

assigning a picked peak value $(t,x)$ on a first trace to a first event;

establishing time of occurrence and predicted time dip per trace $(t, \Delta t)$ values for the picked peak values $(t,x)$ on the first trace;

determining a time window on a further trace at a location determined by $(t, \Delta t)$; and assigning a picked peak value $(t,x)$ on the further trace falling within the time window to the first event.

9. The method of claim 8 further comprising:

determining the actual time dip per trace value $\delta t$ from the thus assigned picked peak value on the further trace and using $\delta t$ as $\Delta t$ for determining location of a time window on a yet further trace and assigning a picked peak value $(t,x)$ on the yet further trace to the first event.

10. The method of claim 9 further comprising:

calculating picked peak values $(t,x)$ for traces intermediate the further trace in the yet further trace responsive to the yet further trace not being the next adjacent trace of the further trace.

11. The method of claim 9 comprising:

truncating a horizon event segment E $\{(t,x)\}$ upon occurrence of picked peak values $(t,x)$ not being assigned thereto for a preselected number of adjacent traces.

12. The method of claim 9 further comprising:

generating a set selected from E $\{(t,x,\delta t)\}$ and E $\{(t,x,)\}$ for the first event segment.

13. The method of claim 8 comprising:

assigning a plurality of events $(t,x)$ to a plurality p of horizon event segments E $\{(t,x)\}$ spanning two or more traces and repeating the steps of claim 8 for each of the horizon event segments.

14. The method of claim 9 comprising:

assigning a plurality of events $(t,x)$ to a plurality p of horizon event segments E $\{(t,x)\}$ spanning two or more traces and repeating the steps of claim 9 for each of the horizon event segments.

15. The method of claim 10 comprising:

assigning a plurality of events $(t,x)$ to a plurality of horizon event segments E $\{(t,x)\}$ spanning two or more traces and repeating the steps of claim 10 for each of the horizon event segments.

16. The method of claim 11 comprising:

assigning a plurality of events $(t,x)$ to a plurality of horizon event segments E $\{(t,x)\}$ spanning two or more traces and repeating the steps of claim 11 for each of the horizon event segments.

17. The method of claim 12 comprising:

assigning a plurality of events (t,x) to a plurality of horizon event segments E {(t,x)} spanning two or more traces and repeating the steps of claim 12 for each of the horizon event segments.

18. The method of claim 12 further comprising:
associating one of the sets E {(t,x)}, E {(t,δt)}, and E {(t,x,δt)} with selected (T,V,X,C') values and generating a set of one-to-one correspondences selected from the group consisting of {(T,V,X,C')←→(t,x)}, {(T,V,X,C')←→(t,δt)}, and {(T,V,X,C')←→(t,x,δt)}.

19. The method of claim 18 wherein the set of {(T,V,X,C')} is further restricted by selecting a T-V fairway range and including only (T,V,X,C') having (T,V) values inside the selected fairway.

20. The method of claim 18 further comprising:
selecting a velocity function using one of the sets of one-to-one correspondences.

21. A method of claim 18 further comprising:
displaying one of the sets of one-to-one correspondences in the T-X domain for assessing quality of velocity picks.

22. The method of claim 18 further comprising:
displaying one of the sets of one-to-one correspondences in the T-X domain for stratigraphic interpretation.

23. The method of claim 18 further comprising:
using one of the sets of one-to-one correspondences for generating interval velocity displays of the subsurface.

24. The method of claim 13 further comprising:
selecting a velocity function using one of the sets of one-to-one correspondences.

25. A method of claim 13 further comprising:
displaying one of the sets of one-to-one correspondences in the T-X domain for assessing quality of velocity picks.

26. The method of claim 13 further comprising:
displaying one of the sets of one-to-one correspondences in the T-X domain for stratigraphic interpretation.

27. The method of claim 13 further comprising:
using one of the sets of one-to-one correspondences for generating interval velocity displays of the subsurface.

28. The method of claim 7 further comprising:
associating one of the sets E {(t,x)}, E {(t,δt)}, and E {(t,x,δt)} with selected (T,V,X,C') values and generating a set of one-to-one correspondences selected from the group consisting of {(T,V,X,C')←→(t,x)}, {(T,V,X,C')←→(t,δt)}, and {(T,V,X,C')←→(t,x,δt)}.

29. The method of claim 28 wherein the set of {(T,V,X,C')} is further restricted by selected a T-V fairway range and including only (T,V,X,C') having (T,V) values inside the selected fairway.

30. The method of claim 28 further comprising:
selecting a velocity function using one of the sets of one-to-one correspondences.

31. A method of claim 28 further comprising:
displaying one of the sets of one-to-one correspondences in the T-X domain for assessing quality of velocity picks.

32. The method of claim 28 further comprising:
displaying one of the sets of one-to-one correspondences in the T-X domain for stratigraphic interpretation.

33. The method of claim 28 further comprising:
using one of the sets of one-to-one correspondences for generating interval velocity displays of the subsurface.

34. The method of claim 28 further comprising:
selecting a velocity function using one of the sets of one-to-one correspondences.

35. A method of claim 6 further comprising
displaying one of the sets of one-to-one correspondences in the T-X domain for assessing quality of velocity picks.

36. The method of claim 6 further comprising:
displaying one of the sets of one-to-one correspondences in the T-X domain for stratigraphic interpretation.

37. The method of claim 6 further comprising:
using one of the sets of one-to-one correspondences for generating interval velocity displays of the subsurface.

38. Apparatus for processing seismic data for geophysical exploration comprising:
means for providing a first set of data points generated from seismic traces;
means for providing a second set of data points generated from seismic traces;
the second set of data points having a smaller number of data points therein than that first set of data points;
the first and second sets of data points having a common parameter represented by a variable in each of the first and second sets of data points; and
means for editing the first set by associating data points of the first set to data points of the second set according to the variable in each of the first and second sets of data points representing the common parameter and generating a set of one-to-one corresponding data points of the first and second sets, the set of one to one corresponding data points comprising a set of associated data points in which each data point of the second data set is associated with one and only one data point from the first data set.

39. The Apparatus of claim 38:
wherein the first set of data points comprises a set {(T,V,X,C)} of velocity spectra data produced by velocity analysis of a set of common midpoint (CMP) gathers, each gather having a CMP location X, and the analysis comprising varying travel time T and trail stacking velocity V over a selected range of values, and determining these values of coherency therefor, the data set therefore comprising a set {(T,V,X,C)} of data;
wherein the second set of data points comprises a set {(t,x)} of data selected from a stacked seismic section; and
wherein the means for associating comprises means associating the travel times t with values T and generating a set {(T,V,X,C)←→(t,x)} therefrom.

40. The apparatus of claim 38:
wherein the first set of data points comprises a set {(T,V,X,C')} of regional coherency peaks of {(T,V,X,C')} velocity spectra data by selecting the location (T,V) of regional coherency peaks C' for velocity spectra at locations X along a seismic line;
wherein the second set of data points comprises a set {(t,x)} of peak event data selected from a stacked seismic section; and wherein the means for associating comprises means for associating the travel time t with values T and generating a set $\{(T,V,X,C')\} \longleftrightarrow (t,x)\}$ therefrom.

41. The Apparatus of claim 40 further comprising means for picking the second set of data points by steps comprising:

means for establishing a threshold for determining which seismic event shall be machine picked;

means for machine scanning each trace contributing to a stacked section and picking seismic events meeting the threshold requirements; and means for characterizing each pick by a (t,x) pair and storing the (t,x) pair as a record of the picks.

42. The Apparatus of claim 41 further comprising:

means for sequencing thus picked peak values (t,x) into horizon event segments E $\{(t,x)\}$ spanning two or more traces;

means for associating the travel time t of selected horizon event segments E $\{(t,x)\}$ with events T of $\{(T,V,X,C')\}$ dataset and generating a set $\{(T,V,X,C') \longleftrightarrow (t,x)\}$ therefrom.

43. The Apparatus of claim 41 further comprising:

means for sequencing thus picked peak values (t,x) into horizon event segments E $\{(t,x)\}$ spanning two or more traces.

44. The Apparatus of claim 43 further comprising:

means for concatenating event segments E (t,x) into horizons H $\{E\{(t,x)\}\}$; and means for associating the travel times t of selected horizons H $\{E\}(t,x)\}\}$ with values T of the (T,V,X,C') dataset and generating a set $\{(T,V,X,C') \longleftrightarrow (t,x)\}$ therefrom.

45. The Apparatus of claim 43 wherein the means for sequencing picked peak values (t,x) into horizon event segments E $\{(t,x)\}$ spanning two or more traces comprises:

means for assigning a picked peak value (t,x) on a first trace to a first event;

means for establishing time of occurrence and predicted time dip per trace (t, $\Delta$t) for the picked peak values (t,x) on the first trace;

means for determining a time window on a further trace at a location determined by (t, $\Delta$t); and means for assigning a picked peak value (t,x) on the further trace falling within the time window to the first event.

46. The Apparatus of claim 43 further comprising:

means for determining the actual time dip per trace value $\delta$t from the thus assigned picked peak value on the further trace and using $\delta$t as $\Delta$t for determining location of a time window on a yet further trace and assigning a picked peak value (t,x) on the yet further trace to the first event.

47. The Apparatus of claim 46 comprising:

means for calculating picked peak values (t,x) for traces intermediate the further trace in the yet further trace responsive to the yet further trace not being the next adjacent trace of the further trace.

48. The Apparatus of claim 46 comprising:

means for truncating a horizon event segment E $\{(t,x)\}$ upon occurrence of picked peak values (t,x) not being assigned thereto for a preselected number of adjacent traces.

49. The Apparatus of claim 46 further comprising:

means for generating a set selected from E $\{(t,x,\delta t)\}$, E $\{(t,x,)\}$, and E $\{(t,x,\delta t)\}$ for the first event segment.

50. The Apparatus of claim 46 comprising:

means for assigning a plurality of events (t,x) to a plurality of horizon event segments E $\{(t,x)\}$ spanning two or more traces for each of the horizon event segments.

51. The Apparatus of claim 43 further comprising:

means for associating one of the sets E $\{(t,x)\}$, E $(t,\delta t)\}$, and E $\{(t,x,\delta t)\}$ with selected (T,V,X,C') values and generating a set of one-to-one correspondences selected from the group consisting of $\{(T,V,X,C') \longleftrightarrow (t,x)\}$, $\{(T,V,X,C') \longleftrightarrow (t,\delta t)\}$, and $\{(T,V,X,C') \longleftrightarrow (t,x,\delta t)\}$.

52. The Apparatus of claim 43 further comprising:

means for associating one of the sets E $\{(t,x)\}$, E $\{(t,\delta t)\}$, and E $\{(t,x,\delta t)\}$ with selected (T,V,X,C') values and generating a set of one-to-one correspondences selected from the group consisting of $\{(T,V,X,C') \longleftrightarrow (t,x)\}$, $\{(T,V,X,C') \longleftrightarrow (t,\delta t)\}$, and $\{(T,V,X,C') \longleftrightarrow (t,x,\delta t)\}$.

\* \* \* \* \*

UNITED STATES PATENT AND TRADEMARK OFFICE
CERTIFICATE OF CORRECTION

PATENT NO. : 5,008,861

DATED : April 16, 1991

INVENTOR(S) : John N. Gallagher

It is certified that error appears in the above--identified patent and that said Letters Patent is hereby corrected as shown below:

Column 2, line 65, "ar" should read --are--.

Col. 12, line 61 "(thd 7, $\Delta t_7$) should read --($t_7$, $\Delta t_7$)--.

Column 15, line 7, (T,V,X,C') should read --{(T,V,X,C')--.

Col. 15, line 61, "velocities ca" should read --velocities can--.

Signed and Sealed this

Twenty-second Day of December, 1992

*Attest:*

DOUGLAS B. COMER

*Attesting Officer*   *Acting Commissioner of Patents and Trademarks*